United States Patent [19]

Sexton et al.

[11] 3,710,948

[45] Jan. 16, 1973

[54] SELF-SUSTAINING POCKET TYPE FILTER

[75] Inventors: Robert W. Sexton, Louisville; Paul L. Brooks, Waddy; Jack M. Carey, Louisville, all of Ky.

[73] Assignee: American Air Filter Company, Inc., Louisville, Ky.

[22] Filed: June 10, 1970

[21] Appl. No.: 44,981

[52] U.S. Cl.................................................210/484
[51] Int. Cl............................................B01d 46/02
[58] Field of Search........55/381, 382, 483, 484, 486, 55/527; 210/484, 489, 493, 491

[56] References Cited

UNITED STATES PATENTS

| | | | |
|---|---|---|---|
| 3,067,504 | 12/1962 | Lubben et al. | 55/381 |
| 3,289,395 | 12/1966 | Getzin | 55/381 X |
| 3,606,740 | 9/1971 | Ballennie | 55/527 X |
| 3,124,440 | 3/1964 | Hogg | 55/484 |
| 3,511,382 | 5/1970 | Mesek | 210/491 X |
| 2,911,101 | 11/1959 | Robinson | 210/489 X |
| 3,479,803 | 11/1969 | Smith | 55/484 X |

FOREIGN PATENTS OR APPLICATIONS 136,461   7/1952   Sweden..................................55/484

*Primary Examiner*—Reuben Friedman
*Assistant Examiner*—F. F. Calvetti
*Attorney*—Ralph B. Brick and Charles G. Lamb

[57] ABSTRACT

An improved pocket type filter formed from faced sections of expansible-compressible filter medium sheets, the filter medium sheets having spaced longitudinally extending filter medium compression seams to compress the medium along the seams and to provide self-sustaining lofted side-by-side longitudinally extending filter medium columns between the seams.

7 Claims, 4 Drawing Figures

PATENTED JAN 16 1973 3,710,948

INVENTORS
ROBERT W. SEXTON
BY PAUL L. BROOKS
JACK M. CAREY

ATTORNEY:

SELF-SUSTAINING POCKET TYPE FILTER

BACKGROUND OF THE INVENTION

The present invention relates to a device for separating contaminant particles from a fluid stream and more particularly relates to a pocket type filter for separating contaminant particles from a gaseous stream.

Various pocket type filters are known in the art of gas filtration, a number of these filters being formed from filter medium which is of an expansible-compressible type. To maintain these pocket type filters in proper position during gas treating operation it has been necessary to depend upon the fluid stream being treated and to utilize complex and expensive header arrangements, external supports and separators. Such arrangements of the past have not only been expensive in construction and maintenance but in addition have often increased gas flow resistance and reduced the overall efficiency of the filters.

SUMMARY OF THE INVENTION

The present invention provides a readily assembled, straight-forward and economic filter construction which permits utilization of expansible-compressible filter medium to provide maximum filtering efficiency and yet at the same time allows such medium to be self-sustaining in the gas stream to be treated. In addition, the present invention provides a pocket type filter arrangement that presents maximum filtering medium thickness in the area of greatest contaminant concentration and, at the same time, assures that the filtering medium pocket is in proper extended position to insure efficient treatment of the contaminant laden gas stream.

Various other features of the present invention will become obvious to one skilled in the art upon reading the disclosure set forth herein.

More particularly, the present invention provides a pocket type fluid filter comprising: a pair of pocket forming sections joined together in end-to-end fashion along a common line to form a closed end of a pocket, the sections having terminal supporting portions remote from the common line to form the mouth of the pocket, the pocket forming sections being folded to face each other and seamed along the longitudinal edges thereof to form the side edges of the pocket, each of the sections including expansible-compressible flexible filter medium sheet means, the filter sheet means having spaced longitudinally extending filter medium compression seams to compress the medium along the seams and to provide self-sustaining lofted side-by-side longitudinally extending filter medium columns between the compression seams. In addition, there can be provided, a rigid flow-through frame member, the terminal supporting portions of the pocket forming sections being fastened to the frame member to provide an open end mouth for the pocket filter. Further, the present invention provides a pocket type fluid filter that offers maximum filter medium thickness in the area of greatest contaminant concentration and, at the same time, insures proper pocket opening.

It is to be understood that various modifications can be made in the assembly, form and construction of the apparatus disclosed herein by one skilled in the art without departing from the scope or spirit of the present invention.

Referring to the drawing which discloses an advantageous embodiment of the present invention and a novel modification thereto:

Figure 1:
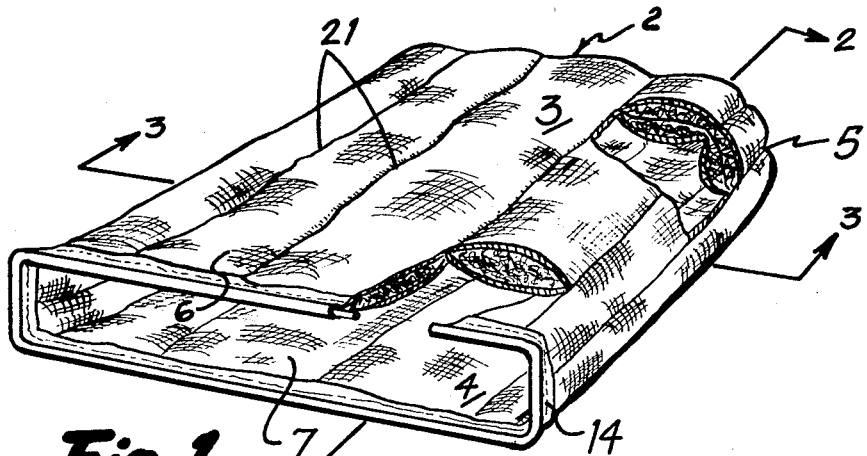
FIG. 1 is a partially broken away perspective view of a pocket type filter arrangement incorporating the novel features of the present invention.
Figure 2:
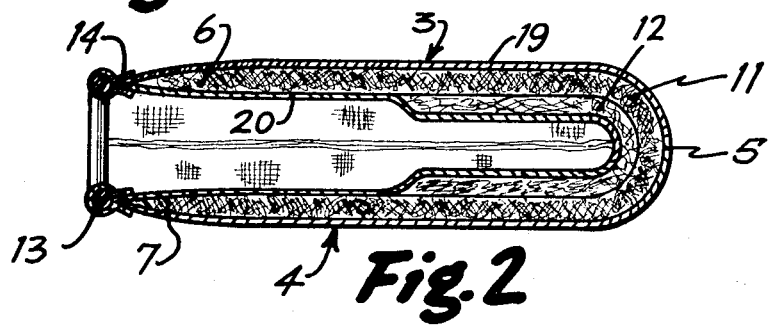
FIG. 2 is a cross-sectional view of the pocket type filter apparatus of FIG. 1 taken in a plane passing through line 2—2 of the apparatus of FIG. 1.
Figure 3:
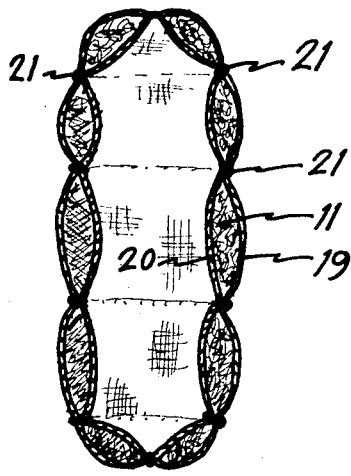
FIG. 3 is a cross-sectional view of the apparatus of FIG. 1 taken in a plane passing through line 3-3 of the apparatus of FIG. 1; and, FIG. 4 is a cross-sectional view of a modified pocket filter taken in a plane similar to that of FIG. 3 disclosing a further novel feature of the present invention.

Referring to FIGS. 1 and 2 of the drawing, the novel filter pocket 2 is disclosed as formed from sections 3 and 4 joined together in end-to-end fashion along common line 5 and folded thereabout to face each other and to form the closed end of the pocket. Advantageously, as in the embodiment disclosed, sections 3 and 4 are formed from integral sheets of material. It is to be understood, however, that the sections can be formed from separate sheets of material and joined together by some suitable means such as sewing, stapling or gluing.

Sections 3 and 4 are each provided with terminal supporting portions 6 and 7 respectively which supporting portions are removed from common line 5. These terminal supporting portions which are fastened to a header frame in a manner described hereinafter serve to form the mouth of pocket 2.

Each of sections 3 and 4 includes a portion of an expansible-compressible flexible filter medium sheet 11. And, as above noted, such filter medium sheet 11 advantageously can be an integral unit serving both sections. It also is to be noted in FIG. 1 and 2 that an inner filter medium sheet 12 is provided. This inner filter medium sheet 12 is shorter than outer sheet 11 so that the outer sheet 11 serves to form the terminal supporting portions 6 and 7 of the pocket. It is to be understood that filter medium sheets 11 and 12 can be formed from any one of several known expansible-compressible filter medium materials. Advantageously, a spun fiber glass filter medium can be utilized.

A frame member 13 which can be formed from any one of several suitably rigid materials such as metal serves to receive terminal supporting portions 6 and 7 to provide an open-ended mouth for the pocket filter. Suitable binding tape 14 is fastened around frame member 13 and the terminal supporting portions 6 and 7 along with a pair of scrim sheets 19 and 20 which extend along the inner and outer faces of the filter medium can be stitched in fast relationship.

As can be seen in the drawing and in accordance with the present invention, each of sections 3 and 4 are provided with spaced longitudinally extending filter medium compression seams 21 which advantageously are sewn but which can be stapled or glued to compress the filter medium along the seam and to provide self-sustaining lofted side-by-side longitudinally extending filter medium columns between the seams. These columns which due to the compression along the seams accomodate more filter medium per unit volume provide rigidity to the filter pocket, making it more stable and permitting the pocket to be held in self-sustaining position in a horizontal plane as well as a vertical one. Ordinarily, if it were not for the compression seams, the pocket when positioned in a horizontal plane, because of the flexibility of the medium, and scrim would not remain erect but would sag under the influence of gravity.

It is to be noted that the flexible inner filter medium sheet 12 which is not joined to the rigid header 13 serves by virtue of its flexibility and tendency to move toward the unfolded flat position not only to maintain the end of pocket 2 adjacent the closed portion thereof in extended position so that the sections 3 and 4 are spaced from each other, but in addition provides extra filter medium thickness at the place most needed—that is, where concentration of contaminant particles in a gaseous stream being treated is the greatest.

Figure 4:
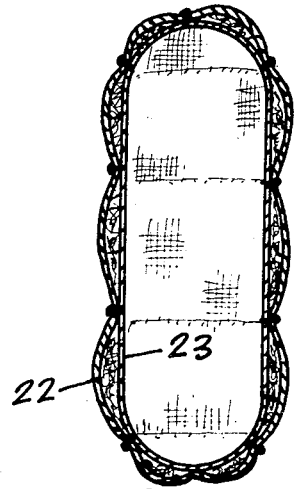

Referring to FIG. 4 of the drawing it can be seen that a pocket type filter arrangement can be provided wherein the outer scrim sheet 22 is of greater breadth than the filter medium and the inner scrim sheet 23 to permit the columns of filter medium between the compression seams to loft outwardly, thus providing a smoother inner surface and reducing resistance to the gas stream to be treated.

The invention claimed is:

1. A pocket type fluid filter comprising: a pair of pocket forming sections, formed from sheets of material with said sections being integral along a common line to form the closed end of said pocket and having terminal supporting portions remote from said common line to form the mouth of said pocket, said pocket forming sections being folded to face each other and seamed along the longitudinal edges thereof to form the side edges of said pocket, each of said sections including inner and outer sheets of scrim material and expansible-compressible flexible filter medium sheet means therebetween, said sections further including longitudinally extending filter medium compression seams each seam lying wholly within a section and each being laterally spaced with respect to the others and extending substantially the entire distance from said closed end of said pocket toward said mouth to compress the filter medium therealong and to provide self-sustaining columns between said compression seams with said outer scrim sheet being of greater width between said compression seams than said filter medium sheet means and said inner scrim sheet to permit said filter medium columns to loft outwardly between said compression seams and give dimensional stability to said sections.

2. The apparatus of claim 1, and a rigid flow-through frame member, said terminal supporting portions of said pocket forming sections being fastened to said frame member to provide an open-end mouth for said pocket filter.

3. The apparatus of claim 1, said filter medium sheet means being of expansible-compressible glass fibers.

4. A pocket type fluid filter comprising: a pair of pocket forming sections joined together in end-to-end fashion along a common line to form the closed end of said pocket and having terminal supporting portions remote from said common line to form the mouth of said pocket, said pocket forming sections being folded to face each other and seamed along the longitudinal edges thereof to form the side edges of said pocket, each of said sections including expansible-compressible flexible filter medium sheet means, said filter medium sheet means including an inner and outer sheet of filter medium, said outer sheet of filter medium being about twice as long as said inner sheet of filter medium to form said terminal supporting portions of said pocket, said terminal supporting portions being fastened to a rigid flow-through frame member to provide an open end mouth for said pocket filter, said inner sheet providing increased filter medium thickness centered at the closed end of said pocket and serving through its resilience to hold said facing sections of said pocket in spaced apart relation adjacent said closed end of said pocket.

5. The pocket type fluid filter of claim 4 wherein said sections further include longitudinally extending filter medium compression seams each seam lying wholly within a section and each being laterally spaced with respect to the others and extending substantially the entire distance from said closed end of said pocket toward said mouth to compress the filter medium therealong and to provide self-sustaining columns between said compression seams and give dimensional stability to said sections.

6. The pocket type fluid filter of claim 5 additionally comprising a pair of scrim sheets extending along the inner and outer faces of said filter medium sheet means, said scrim sheets being joined to said filter medium means by said longitudinally extending compression seams, said outer scrim sheet being of greater width between said compression seams than said filter medium and said inner scrim sheet, to permit said filter medium columns to loft outwardly between said compression seams.

7. The apparatus of claim 6 wherein said filter medium is comprised of expansible-compressible glass fibers.

* * * * *